United States Patent
Geurts et al.

(10) Patent No.: US 7,777,730 B2
(45) Date of Patent: Aug. 17, 2010

(54) BROWSING MEDIA ITEMS

(75) Inventors: Lucas Jacobus Franciscus Geurts, Eindhoven (NL); Andreas Henricus Elisabeth Lamers, Eindhoven (NL); Johanna Maria De Bont, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 955 days.

(21) Appl. No.: 11/568,615

(22) PCT Filed: May 2, 2005

(86) PCT No.: PCT/IB2005/051426

§ 371 (c)(1),
(2), (4) Date: Nov. 3, 2006

(87) PCT Pub. No.: WO2005/106637

PCT Pub. Date: Nov. 10, 2005

(65) Prior Publication Data

US 2007/0222768 A1    Sep. 27, 2007

(30) Foreign Application Priority Data

May 5, 2004    (EP)   ................................. 04101926

(51) Int. Cl.
*G06F 3/041*    (2006.01)
(52) U.S. Cl. ...................................... 345/173; 715/854
(58) Field of Classification Search ......... 345/173–180; 715/854, 841, 834
See application file for complete search history.

(56) References Cited

U.S. PATENT DOCUMENTS

| 5,664,132 | A | * | 9/1997 | Smith | ........................ 715/834 |
| 5,977,974 | A | | 11/1999 | Hatori et al. | |
| 6,285,367 | B1 | * | 9/2001 | Abrams et al. | .............. 715/854 |
| 6,301,586 | B1 | | 10/2001 | Yang et al. | |
| 7,046,230 | B2 | * | 5/2006 | Zadesky et al. | ............. 345/156 |
| 7,109,975 | B2 | * | 9/2006 | Fedorak et al. | ............. 345/173 |
| 7,516,419 | B2 | * | 4/2009 | Petro et al. | .................. 715/834 |
| 2002/0063737 | A1 | | 5/2002 | Feig et al. | |
| 2003/0007006 | A1 | | 1/2003 | Baar et al. | |

FOREIGN PATENT DOCUMENTS

WO    0013104    3/2000

OTHER PUBLICATIONS

T. Alan Keahey et al; "Nonlinear Magnification Fields", Inf. Visualization, 1997, Proc. IEEE Symposium on Phoenix, AZ, Oct. 28, 1997, pp. 51-58, 121, XP010257169.
C. Daassi et al; "Visual Exploration of Temporal Object Databases", Proceedings of BDA, Oct. 24-27, 2000, Blois, France, pp. 159-178.

(Continued)

*Primary Examiner*—Kevin M Nguyen

(57) ABSTRACT

A method of navigating, organizing, browsing, searching, and selecting information objects and/or content in a ring based structure is provided wherein the relation between rings are clear and easily grasped. The method is particularly well suited for navigating in media content. The method comprises locating a number of information objects, displaying one or more of the information objects on a display in a ring based structure comprising one or more rings, and changing the size of a specific ring by selecting the specific ring. By this enlargement, the visibility of information objects comprised in the specific ring is increased, and the individual information objects visually present in the ring, may readily be selected from the enlarged ring.

12 Claims, 4 Drawing Sheets

OTHER PUBLICATIONS

Brian Amento; "User Interfaces for Topic Management of Websites", 2001, Ph.D.,Thesis in Computer Science and Applications. Sep. 26, 2001.

F. Vernier et al; "Visualization Techniques for Circular Tabletop Interfaces",Advanced Visual Interfaces, May 2002, Trento, Italy.

* cited by examiner

BROWSING MEDIA ITEMS

FIELD OF INVENTION

The present invention relates to the field of browsing information objects and particular media content on computers. The information objects are arranged in a ring based structure, for example building on the metaphor of annual tree rings.

BACKGROUND OF THE INVENTION

In a typical browsing environment on a computer, information objects, such as media content are represented in lists where a user can select an object or item from the list. The data in the list may be arranged and rearranged by time data information associated with each object.

However, the amount of information that can be represented in such a list structure is limited and the user may easily loose the overview during navigation.

It has, furthermore, been disclosed to arrange data in a structure of concentric circles by C. Daassi, M. Dumas, et al., "Visual exploration of temporal object databases", Proceedings of BDA'00, 24-27 Oct. 2000, Blois, France, pp. 159-178. Data are arranged in the periods according to e.g. time data and a circle is associated with each period. Thus, when navigating in a large data space arranged in a high number of periods, the number of circles is high too, and may increase the possible number of circles to be displayed in one screen picture. Therefore, a time slider is provided so as to select which time periods are to be displayed on the screen. Hereby, e.g. 5 circles corresponding to 5 periods of time may be shown at a time.

In this way concurrent navigation in all periods is limited by the limited screen picture and navigation in other periods than the displayed requires shift of the period display view with the time slider whereby the user easily looses the overview of the navigation and the relation between periods.

SUMMARY OF THE INVENTION

It is an object of the present invention to provide a method of navigating information objects in a ring based structure wherein the relation between rings are clear and easily grasped.

The above and other objects are fulfilled by a method of navigation information, wherein the method comprises the steps of locating a number of information objects, displaying one or more of the information objects on a display in a ring based structure comprising one or more rings, and changing the size of a specific ring by selecting the specific ring.

Hereby, the visibility of information objects comprised in the specific ring is increased, and furthermore, individual information objects visually present in the ring, may readily be selected from the enlarged ring.

The method thus provides a way of navigating in information objects and thus a method of organising, browsing, searching, and selecting information objects/contents.

The information objects may be any objects, such as data objects, application objects, media objects, such as pictures, videos, etc. The objects may be stored in a processing unit, such as a computer; they may be stored on removable medias, such as DVDs, CD-ROMs, etc. and may be connected to the display via a processing unit.

Selection of a specific ring may be performed by touching or tapping at the specific ring, or a ring may be selected by a scanning means sweeping or scanning over the specific ring. The scanning may be performed for example by rotary dials and/or push buttons. The touching of the display may be provided by a touch of a touching means, such as a pen, a finger, etc.

In one embodiment, for a specific ring to be selected by the scanning means, a short delay may be incurred before a ring is actually selected. Hereby, fast scanning through many rings may be provided without each of the rings being selected.

In a preferred embodiment, scanning at an intermediate/normal speed will move the enlargement of selected rings along with the scanning. When the indicator hits a media item, this item may start to play, either on one or more screen, in speakers, etc, according to the content type. Hereby, the user may build up a quick impression of the content associated with a ring. Preferably, the content is faded in and out, as the user rotates the dial, at least when the content is video and audio, and preferably the content is faded using video and audio blending.

The scanning may e.g. be visualised with a scanning indicator, such as a circular scanning indicator, real or imaginary, and the position of the scanning indicator thus indicating the presently selected ring. The scanning may by default start from the centre of the ring, but all other default starting points may be envisaged. Furthermore, the user may enter a default start position via a user interface Each information object may have an associated time value and the information objects may then be organised in the ring structure according to their time value. Hereby, a specific ring may correspond to a specific period, such as a specific year of a person's life, etc. The rings may be broken down in smaller or other time periods according to user selection via a user interface.

The ring based structure may comprise a number of consecutive rings. The rings may be nested, and the nesting may be time based or e.g. content based so that all files of a specific type are gathered in one ring. Furthermore, combined nestings may be provided, so as to have e.g. several sets of time based rings, one set comprising image content, one set comprising video contents, etc.

When a specific ring is selected and the size of this ring is increased, also more content may be displayed.

The sizes of other rings not currently selected may be decreased with the increase of size of the specific ring. Additionally or alternatively, the size of the rings neighbouring the selected ring may be increased. The increase may be gradually, so that immediate neighbours are increased relatively more than the 2nd, 3rd and 4th neighbour. In this way a so-called fish-eye zoom may be provided. Also when scanning the rings, the zoom may move along with the scan so that focus is at the currently selected ring, i.e. the ring on which the scanning indicator is presently positioned with neighbouring rings being increased in size according to this fish eye zooming method.

The fish eye zooming approach is thus meant to show the structure around the currently selected ring or node in detail, and show less detail as the distance from the currently selected ring increases In a preferred embodiment, the objects are displayed on a touch screen display, and the size of the specific ring may then be changed by touching the specific ring. A scanning like mechanism may then be provided by dragging the finger over the screen.

The touch screen is, thus, an input device that allows the user to interact with the processing unit by touching the display screen.

The screen may be a pressure sensitive touch screen display, and the pressure of a touch contact with the display may be sensed. Hereby, different steps may be carried out when the pressure of a touch is increased. The same effect may be obtained by using timer information so that different steps may be carried out according to the length of the touch contact.

For example, the size of a specific ring may increase with the increase of the applied touch contact time or pressure. By increasing the size of a specific ring also more information objects may be revealed.

Furthermore, when an information object is touched with a certain pressure or in a certain time, content of the information object may be shown. A light or short touch of an information element may then show preview windows, comprising selected keywords, a thumbnail of the content, such as a small picture, a brief sound, or a short video clip. A longer touch or a higher pressure touch may then open the specific information content, such as the information content file. Thus, specific thresholds for time and pressure may be given for selection, thumbnail view, opening, etc. A number of levels may be specified each showing more or different information about the selected information object.

Preferably, when the pressure is released, the preview window is gradually faded away, and return to the original state, hiding the extra objects or the extra information again.

Furthermore, when an information object is opened by applying a longer touch or a higher pressure touch, the preview windows may be faded out to focus on the selected object. When e.g. the increased pressure is released, the previous preview windows may fade in again.

The preview windows may contain textual information, sample pictures of an album, video sequences, such as a sequence of key frames for a video, an audio sample, etc.

The fade out may take place after e.g. 3 second of display, or after 5, 10, or 15 seconds. Preferably, the fade out time may be selectable by the user.

Furthermore, for visual information, such as images and videos, to be presented different display options may be employed. In one embodiment, the pressure of the touch may be linked to the transparency of the visual information. If the pressure is above a certain threshold, a preview image will start to appear and is shown using transparency, e.g. using alpha blending. If the user applies more pressure, the image may become clearly visible and be fully non-transparent (opaque) when the pressure reaches its maximum level. If the user release the pressure, the image will disappear, preferably by fading out. In another embodiment, the image/video may be presented for a very short time, for example in a volatile way. If the pressure is above a certain threshold, a sample image of the photo album or a snippet of the video may be shown for a short time, fading out in time. If the user releases the pressure and applies pressure again, a new random sample may be shown.

In still another embodiment, a preview may be shown as long as the pressure is above the threshold. If the user release the pressure, the image will disappear, preferably using fade out.

For audio sample previews, these same three principles may be applied in a similar manner: In one embodiment, the pressure level of the touch may be linked to the volume of the audio. If the pressure is above a certain threshold, the audio sample will start at a minimum volume level, and as the pressure is increased the volume is similarly increased, preferably until to a certain maximum level is reached, with the pressure at its maximum level. If the user release the pressure the audio sample will stop playing, for example using fade out. In another embodiment a short audio sample may be played. If the pressure is above a certain threshold, a random sample of the audio may be played. If the user releases the pressure and applies pressure again, a new random sample may be played.

In a still further embodiment, the audio preview may be played as long as the pressure is above the threshold. If the user releases the pressure, the audio will stop playing, and preferably the audio will fade out.

It is envisaged that more preview windows may be open simultaneously, one or more preview windows displaying text or pictures may be concurrently open, but it is preferred to have only one audio and/or video content information window opened at a time.

The selection of an information object for processing, such as play back or execution, may also be performed by dragging the selected object to a player or processor indicated on the display, or by throwing the information object to a renderer. Thus the item may be dragged at a certain speed and when it is released it may animate the boundary of the screen and may then be 'catched' be an adjacent renderer, e.g. in the trajectory path of the item. Hereby, the item will be played at this renderer.

The navigating in the ring based structure may be performed also while an object is being opened. Thus, the user may keep exploring the information in the rings listening to or viewing other information objects.

New information objects, such as media items, may be added by providing the items or a representation of the objects to the display and then drag the object to the desired location. Preferably, a number of descriptive keywords may also be added to the information object. New media may also be automatically located in the ring based structure according to associated time information, object type, etc.

Furthermore, objects or items may be added using proximity sensing. Thus, when a storage, such as the storage of a digital camera, is provided next to the navigation system, the content, that is the objects, such as pictures, stored in the storage may be made available on the display, preferably, outside the ring structure, and preferably the current ring, e.g. representing the current year, is opened up by default. Hereafter, the user will be able to drag the objects into the navigating structure whereby the objects are copied from the camera to the navigation system and to a hard disk or storage system of the navigating system.

The present invention further relates to a computer program product, which is stored on a storage medium and can be loaded into the main memory of a processor and execute the following steps using the processor:

locating a number of information objects, displaying one or more of the information objects on a display in a ring based structure comprising one or more rings, lecting a specific ring, and changing the size of a specific ring by selecting the specific ring to thereby enhance visibility of information objects comprised in the specific ring.

In a further aspect of the present invention a computer system for media content navigation, organisation, selection and browsing, is provided, the system comprising: a processing means, a number of information objects stored on a storage medium in communication with the processing means, a display in communication with the processing means and the information objects for displaying one or more of the information objects in a ring based structure, wherein the size of a specific ring is changed by selecting the specific ring to thereby enhance visibility of information objects comprised in the specific ring.

In a still further aspect of the present invention, a graphical user interface is provided. The user interface may allow for interaction between the user and the navigating system. The graphical user interface comprises a touch screen display displaying information objects in a ring based structure comprising a number of rings, wherein navigating through information objects are performed by touching specific rings to thereby increase the size of a specific ring comprising specific information objects. The user may furthermore enter an angle and a distance at which a new item is to appear in the ring. If the ring is to reflect for example a year, a user may just enter e.g. a date to have the object correctly positioned in the structure.

The information objects may also be provided with a weight factor, so that the objects may be displayed indicating the importance of a specific object in relation to other object. The objects may be differentiated by the size of the object according to weight factor or by applying different colours to different weight factor ranges.

DETAILED DESCRIPTION OF THE DRAWINGS

Figure 1:
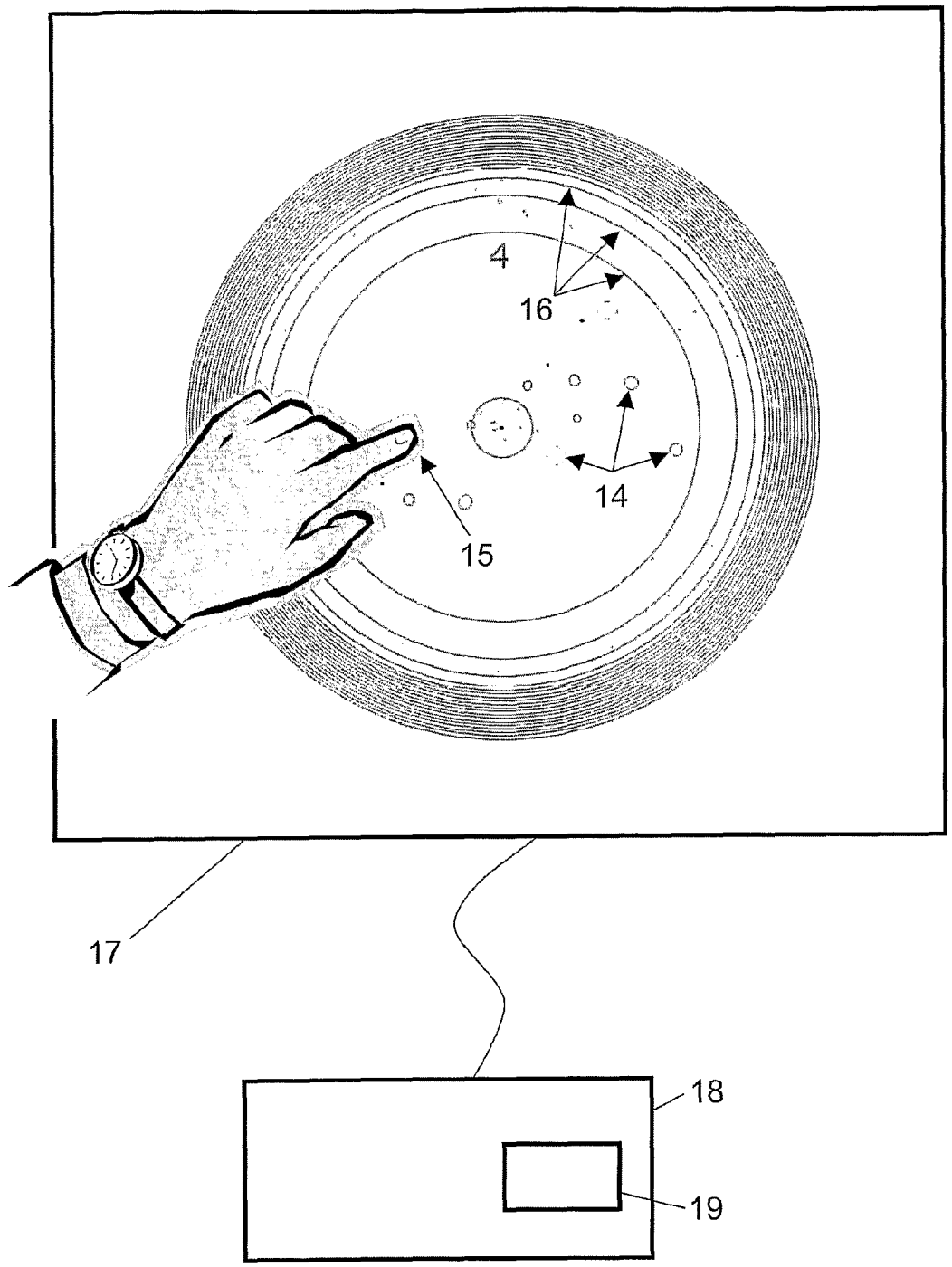
FIG. 1 shows an example of a structure wherein the finger touches the year 4.

FIG. 1 shows a display screen 17 wherein information objects are distributed in a structure corresponding to the rings of a tree. In FIG. 1, a structure comprising 40 rings 16 is shown and a touch by a touching means, here a finger, 15 at year 4 is shown. The ring marked 4 is enlarged and information objects 14 or content items 14 are visible. It is further seen that also neighbouring rings are enlarged and are showing content items, however not all content items are visible and they are furthermore relatively small.

The display screen is in communication with processing means 18 and the information objects are stored on storage means 19, which may be removable.

Figure 2:
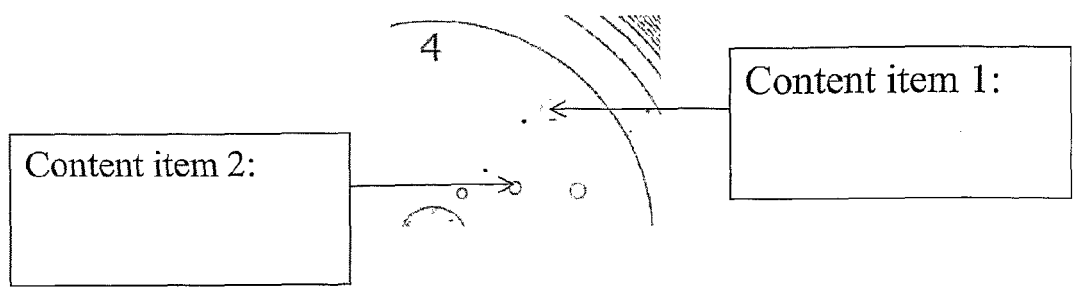
FIG. 2 shows an example of content provided with an object.

In FIG. 2 a detailed view of a couple of information items is provided. By applying a light pressure to the information object, additional information about the object and the content is provided. An example of a short description for content item 1 and 2 are given in the below table.:

|  | Content item 1 | Content item 2 |
| --- | --- | --- |
| Year | 4 | 4 |
| Angle | 40 degrees | 50 degrees |
| Distance | 0.9 | 0.3 |
| Text | "Holiday Barcelona" | "Trip to Spain" |
| Weight | 0.8 | 0.6 |

The media content item is positioned by the user himself. He is able to set the angle and distance at which the item is to appear within the year ring. Furthermore he is able to define the associated text and weight of the item. The weight indicates the importance of the item relative to other items, and will be used for displaying (e.g. size or colour of the item).

Figures 3A, 3B, 3C:
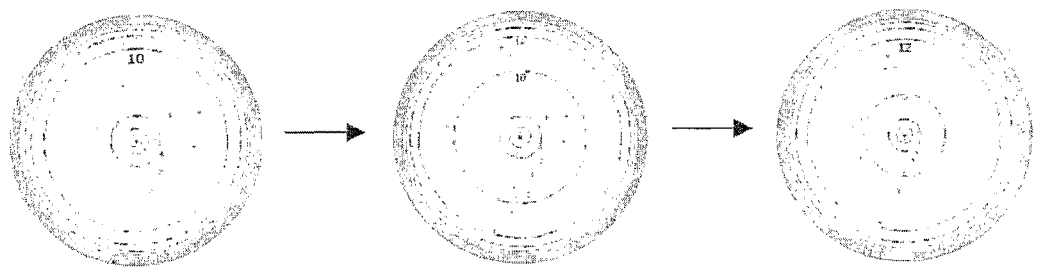
FIG. 3 shows information zooming by applying more pressure.

FIGS. 3a-c shows finger based browsing where the user moves his finger over the tree rings for browsing in the structure. This movement will move a fish-eye view window over the visualisation of the structure. This window will show more content of a specific time period by enlarging the focussed ring and adjacent rings. When, the finger is moved over the structure, the fish eye view is moved along the finger centre, as it is seen in FIGS. 3a-c, wherein the finger is moved from ring 10 to 12.

Figures 4A, 4B, 4C:
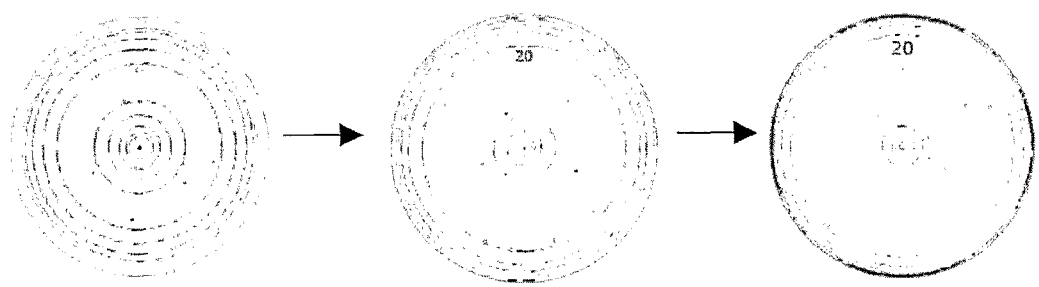
FIG. 4 shows the provision of a rotary dial to scan objects.

In FIGS. 4a-c, it is seen that when the user applies more pressure (through the touch screen), the fish-eye view window will expand and more items will be shown. Thus, it is seen that the pressure is gradually increased from FIG. 4a to 4b and 4c. Preferably, the fish-eye window will gradually disappear (after a few seconds) when the pressure is released and go to its original state, hiding the extra items again.

Figure 5:
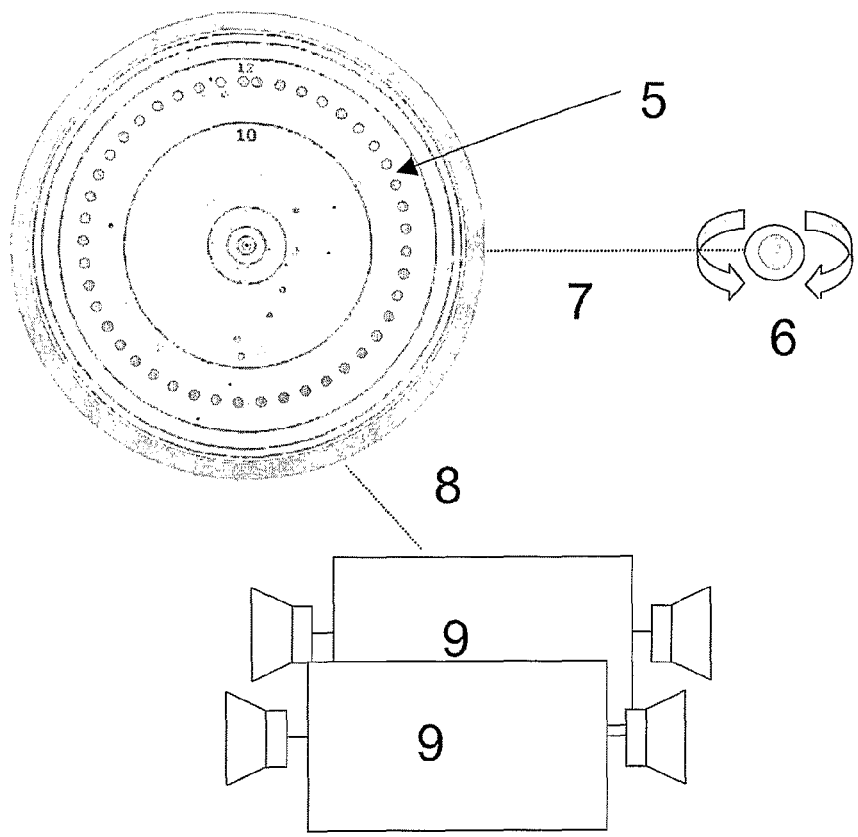
FIG. 5 shows how e.g. increased pressure shows additional info and plays a preview of a media item.

In FIG. 5, an alternative or additional way of browsing is offered by a rotary dial. This dial builds on the metaphor of an analogue radio, which is used to scan radio stations. By rotating the dial 6, the user can quickly move the fish-eye view focus over the content rings. An imaginary scan indicator 5 will move through from the centre to the outside of the circles and controls the movement as indicated by 7. Together with this indicator the fish-eye view will move, acting the same as if a finger is moving over the touch screen.

If the indicator hits a media item, a preview will be played on one or more screens or speakers 9 (depending on the content type) connected or associated with the tree structure as indicated by broken line 8. In this way a quick impression of the content associated with a ring can be build up by the user. To make it more natural to the user, the content is faded in and out (video and audio blending) as the user rotates the dial.

Figure 6:
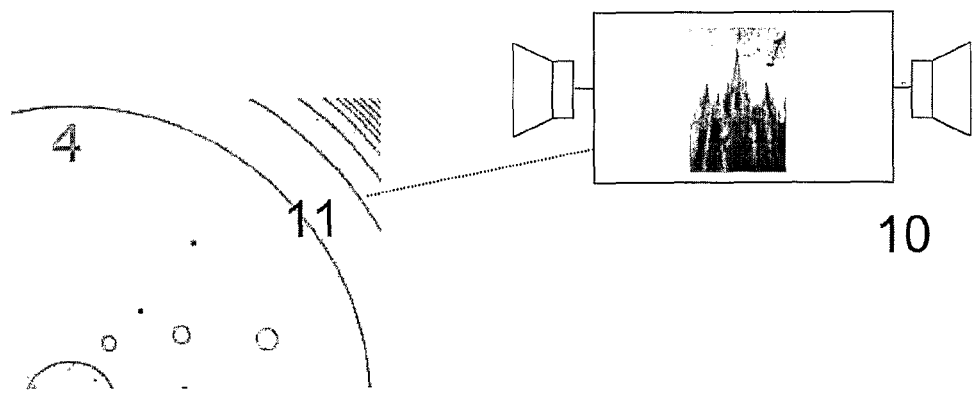
FIG. 6 shows a preview picture.

In FIG. 6, a finger based navigation on a pressure sensitive touch screen is shown. When the user moves his finger over an item it will open up and the text will be displayed. The text will fade away in a certain time period (e.g. three seconds). Multiple items may be opened up (to display text) and are visible at the same time. In this way the visual clutter is reduced.

Note that the opening up of items and browsing the rings (i.e. top level navigation) may happen while the user still has his finger on the touch screen. In this way the user can explore information hidden in the rings, in a simple way.

If the user applies more pressure on an item, more information about the content item is presented. This may be in the form of additional text 11 stating e.g. "Holiday in Barcelona, August 1984" and/or a preview 10. In case of a preview 10, e.g. sample pictures of an album, a sequence of key frames for a video, or an audio sample is presented. More sample pictures may be shown sequentially in the preview, e.g. in the way a slide show is presented; the pictures may be changed with fixed pre-set time intervals.

The amount of information that is presented is linked to the amount of pressure that is given on the touch screen. If more information is presented (when applying more pressure), the other information on the display will fade-out to enable the user to focus more on the presented preview/additional text. If the pressure is released by the user, the additional information/preview will fade-out and the other information will fade-in again. For textual information this principle can be applied in the following way. If the pressure is above a certain threshold, additional text will be displayed 11. If more pressure is applied more information will be shown about this item. A number of different pressure levels can be defined. Each level links to a certain textual information level of detail. If the pressure is released, the additional information will disappear.

Figure 7:
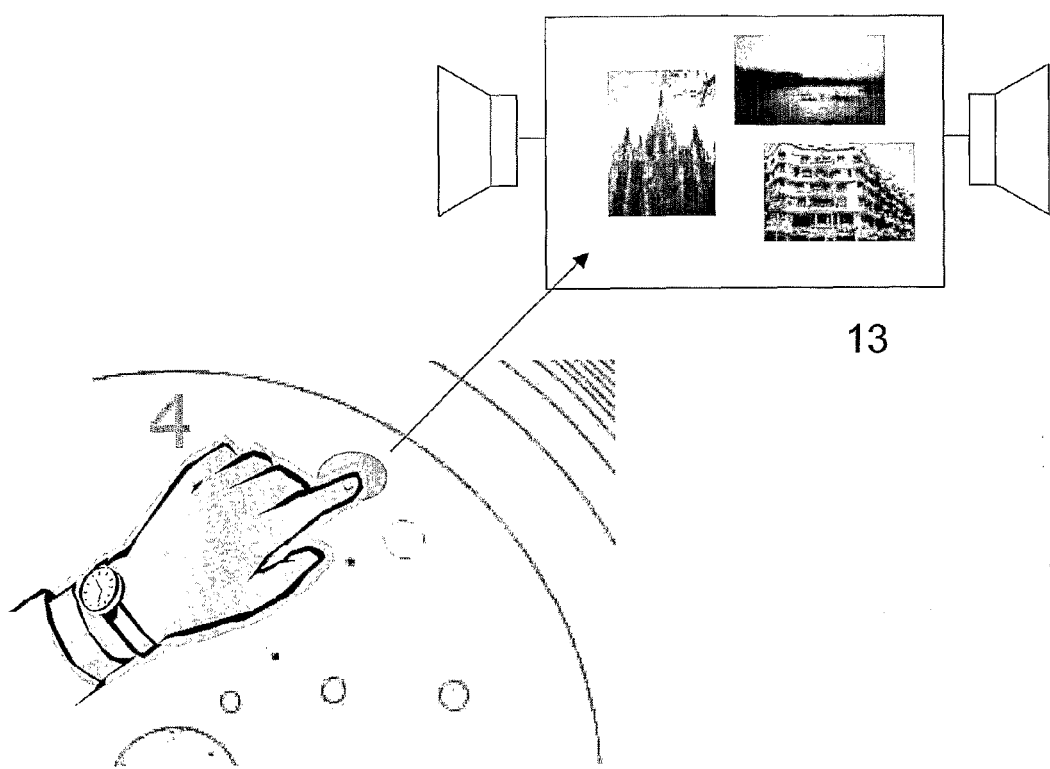
FIG. 7 shows how an information object is selected for playing on a media renderer.

In FIG. 7 playing of content is shown. When the user keeps his finger pressed and drags the item, it is implicitly selected and the preview playback will stop. It may appear as a ghost shadow underneath the finger of the user; the original item is still at the same position. By dragging or throwing the item to a display or audio device 13 the content item or information object will be played, so that the slide show of photos of Barcelona is presented.

Any reference signs appearing in the claims shall not be construed as limiting the scope of the invention.

The invention claimed is:

1. A method of navigating information, comprising:
   locating a number of information objects;
   displaying at least one of the information objects on a display in a ring based structure including a plurality of rings, where each of the plurality of rings displays the at least one of the information objects in a continuous, non-interrupted manner;
   increasing a size of a specific ring by selecting the specific ring to enhance visibility of the information objects included in the specific ring; and
   decreasing sizes of other rings by increasing of the size of the specific ring.

2. The method according to claim 1, wherein the selecting comprises at least one of touching, tapping and scanning over the specific ring to be selected.

3. The method according to claim 2, wherein the scanning is performed by rotary dials or push buttons.

4. The method according to claim 1, wherein the information objects are displayed on a touch screen display, and wherein the size of the specific ring is changed by touching the specific ring.

5. The method according to claim 4, wherein the touch screen display is a pressure sensitive touch screen display, and wherein the method further comprises sensing the pressure of a touch contact with the display.

6. The method according to claim 5, wherein the size of a specific ring increases with the increase of the applied touch contact pressure.

7. The method according to claim 4, wherein the size of the ring is particularly increased in the area of the touch.

8. The method according to claim 4, wherein the touch is moved on the touch screen and the size increase is moved along the touch.

9. The method according to claim 1, wherein each information object has an associated time value and wherein the information objects are organized in the ring structure according to their time value.

10. The method according to claim 1, wherein an information object is selected and thrown at a renderer for playing.

11. A computer program, embedded in a computer-readable medium, which when executed by a tangible processor performs acts comprising:
    locating a number of information objects;
    displaying at least one of the information objects on a display in a ring based structure including a plurality of rings, where each of the plurality of rings displays the at least one of the information objects in a continuous, non-interrupted manner;
    increasing a size of a specific ring by selecting a specific ring to enhance visibility of the information objects included in the specific ring; and
    decreasing sizes of other rings by increasing of the size of the specific ring.

12. A computer system for media content navigation, organization, selection and browsing, the system comprising:
    a processing means,
    a number of information objects stored on a storage medium in communication with the processing means,
    a display in communication with the processing means and the information objects for displaying at least one of the information objects on a display in a ring based structure including a plurality of rings, where each of the plurality of rings displays the at least one of the information objects in a continuous, non-interrupted manner;
    wherein a size of a specific ring is increased by selecting the specific ring to enhance visibility of the information objects included in the specific ring, sizes of other rings being decreased by increasing of the size of the specific ring.

* * * * *